US012603449B2

(12) United States Patent
Yang et al.

(10) Patent No.: US 12,603,449 B2
(45) Date of Patent: Apr. 14, 2026

(54) CONNECTION STRUCTURE AND ELECTRONIC SUBSTRATE

(71) Applicant: LENOVO (SINGAPORE) PTE. LTD., Singapore (SG)

(72) Inventors: Xueyong Yang, Yokohama (JP); Dante Eco Gomez, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 367 days.

(21) Appl. No.: 18/543,318

(22) Filed: Dec. 18, 2023

(65) Prior Publication Data

US 2024/0322471 A1      Sep. 26, 2024

(30) Foreign Application Priority Data

Mar. 20, 2023     (JP) ................................. 2023-044093

(51) Int. Cl.
 *H01R 12/79*          (2011.01)
 *G06F 1/16*           (2006.01)
(52) U.S. Cl.
 CPC ........... *H01R 12/79* (2013.01); *G06F 1/1683* (2013.01)
(58) Field of Classification Search
 CPC ...... H01R 12/79; H01R 12/771; H01R 24/00; G06F 1/1683; H01B 7/08; H01B 7/36; H05K 1/18
 See application file for complete search history.

(56) References Cited

FOREIGN PATENT DOCUMENTS

| | | | | | |
|---|---|---|---|---|---|
| CN | 206236903 | U | * | 6/2017 | |
| CN | 109546446 | A | * | 3/2019 | ........... H01R 13/631 |
| CN | 112086827 | A | * | 12/2020 | ........... H01R 13/502 |
| JP | 08148792 | A | | 6/1996 | |
| JP | 2006332487 | A | | 12/2006 | |
| JP | 2008117947 | A | | 5/2008 | |
| JP | 2009188156 | A | | 8/2009 | |
| JP | 2010010395 | A | | 1/2010 | |
| JP | 2012129354 | A | | 7/2012 | |
| JP | 2013131549 | A | | 7/2013 | |
| JP | 2022087383 | A | | 6/2022 | |

* cited by examiner

*Primary Examiner* — Travis S Chambers
(74) *Attorney, Agent, or Firm* — SHIMOKAJI IP

(57) ABSTRACT

A connection structure and an electronic substrate can prevent poor connection between a connector and a flat cable. On the electronic substrate of the connection structure, at a location where a connector is to be mounted, a Type 1 connector line is marked in an X1 direction, and a Type 2 connector line is marked in an X2 direction. A Type 1 cable line is marked so as to be partly exposed with respect to the flat cable, and a Type 2 cable line is adjacently marked on the outer side thereof. At the edge in the X2 direction, the Type 2 cable line is covered, and the Type 1 cable line is adjacently marked on the outer side thereof. The Type 1 lines are solid lines and the Type 2 lines are dashed lines.

6 Claims, 6 Drawing Sheets

CONNECTION STRUCTURE AND ELECTRONIC SUBSTRATE

BACKGROUND OF THE INVENTION

Field of the Invention

The present invention relates to a connection structure in which a flat cable is connected to a connector mounted on an electronic substrate, and an electronic substrate on which a connector that connects and fixes a flat cable is mounted.

Description of the Related Art

Flat cables such as FPCs have excellent flexibility, can be bent, provide a high degree of freedom in routing, and are sometimes applied to electronic apparatuses such as laptop PCs. A flat cable is connected to a connector mounted on an electronic substrate (refer to Japanese Unexamined Patent Application Publication No. 2022-087383).

SUMMARY OF THE INVENTION

In the meantime, there are cases where, depending on the performance of a mounting machine or the like, a connector is mounted displaced from a normal position in an electronic substrate to such an extent that the displacement is almost visually unrecognized. For this reason, even if a worker sets a flat cable at a normal position and connects the flat cable to the connector, there is a concern that poor connection may occur. Especially electronic apparatuses such as laptop PCs are required to have higher performance and be more compact, and there is a trend for connectors and flat cables to also become smaller and have narrower pitch, thus leading to concerns that the above-described poor connection may occur due to slight mounting errors.

The present invention has been made with a view toward the above-described problem, and it is an object of the invention to provide a connection structure and an electronic substrate that can prevent poor connection between a connector and a flat cable.

To solve the problem described above and to achieve the object, a connection structure according to a first aspect of the present invention is a connection structure in which a flat cable is connected to a connector mounted on an electronic substrate, including: a Type 1 connector line that is marked along an extending direction of the flat cable on one side in a width direction orthogonal to the extending direction, and a Type 2 connector line that is marked along the extending direction on the other side, at a location where the connector is to be mounted; and a Type 1 cable line and a Type 2 cable line that are adjacently marked along the extending direction on both ends in the width direction at a location where the flat cable extends. The Type 1 connector line and the Type 2 connector line are marked in such a manner as to be covered by the connector mounted, with outer edges thereof matching the connector. At an edge of the one side of the flat cable, a Type 1 cable line is marked on an inner side and a Type 2 cable line is marked on an outer side, with the edge being a border therebetween. At an edge of the other side of the flat cable, a Type 1 cable line is marked on an outer side and a Type 2 cable line is marked on an inner side, with the edge being a border therebetween. The Type 1 connector line and the Type 1 cable line are lines of the same type, and the Type 2 connector line and the Type 2 cable line are lines of the same type but are lines of a different type from the Type 1 connector line and the Type 1 cable line.

Further, a connection structure according to a second aspect of the present invention is a connection structure in which a flat cable is connected to a connector mounted on an electronic substrate, including: a Type 1 connector line that is marked along an extending direction of the flat cable on one side in a width direction orthogonal to the extending direction, and a Type 2 connector line that is marked along the extending direction on the other side, at a location where the connector is to be mounted; and a Type 1 cable line and a Type 2 cable line that are marked in parallel on both ends in the width direction at a location where the flat cable extends. The Type 2 connector line is covered by the connector, and the Type 1 connector line is partly exposed. At an edge of the one side of the flat cable, the Type 1 cable line is marked along the extending direction so as to be partly covered by the flat cable, and the Type 2 cable line is marked so as to be exposed at a position adjacent to the outer side of the Type 1 cable line. At an edge of the other side of the flat cable, the Type 1 cable line is marked along the extending direction so as to be partly covered by the flat cable, and the Type 2 cable line is marked at a position adjacent to the inner side of the Type 1 cable line. The Type 1 connector line and the Type 1 cable line are lines of the same type, and the Type 2 connector line and the Type 2 cable line are lines of the same type but are lines of a different type from the Type 1 connector line and the Type 1 cable line.

Further, an electronic substrate according to a third aspect of the present invention is an electronic substrate on which a connector that connects and fixes a flat cable is to be mounted, including: a Type 1 connector line that is marked along an extending direction of the flat cable on one side in a width direction orthogonal to the extending direction, and a Type 2 connector line that is marked along the extending direction on the other side, at a location where the connector is to be mounted; and a Type 1 cable line and a Type 2 cable line that are marked in parallel on both ends in the width direction at a location where the flat cable extends. The Type 1 connector line and the Type 2 connector line are marked so as to be covered by the connector, which is to be mounted at a normal position, outer edges thereof matching the connector. At an edge of the one side of the flat cable to be connected and fixed at a normal position, a Type 1 cable line is marked on an inner side and a Type 2 cable line is marked on an outer side, with the edge being a border therebetween. At an edge of the other side of the flat cable to be connected and fixed at a normal position, a Type 1 cable line is marked on an outer side and a Type 2 cable line is marked on an inner side, with the edge being a border therebetween. The Type 1 connector line and the Type 1 cable line are lines of the same type, and the Type 2 connector line and the Type 2 cable line are lines of the same type but are lines of a different type from the Type 1 connector line and the Type 1 cable line.

According to the above-described aspects of the present invention, poor connection between a connector and a flat cable can be prevented.

DETAILED DESCRIPTION OF THE INVENTION

The following will describe in detail an embodiment of a connection structure and an electronic substrate according to the aspects of the present invention with reference to the accompanying drawings. It should be noted that the present invention is not limited by the embodiment.

Figure 1:
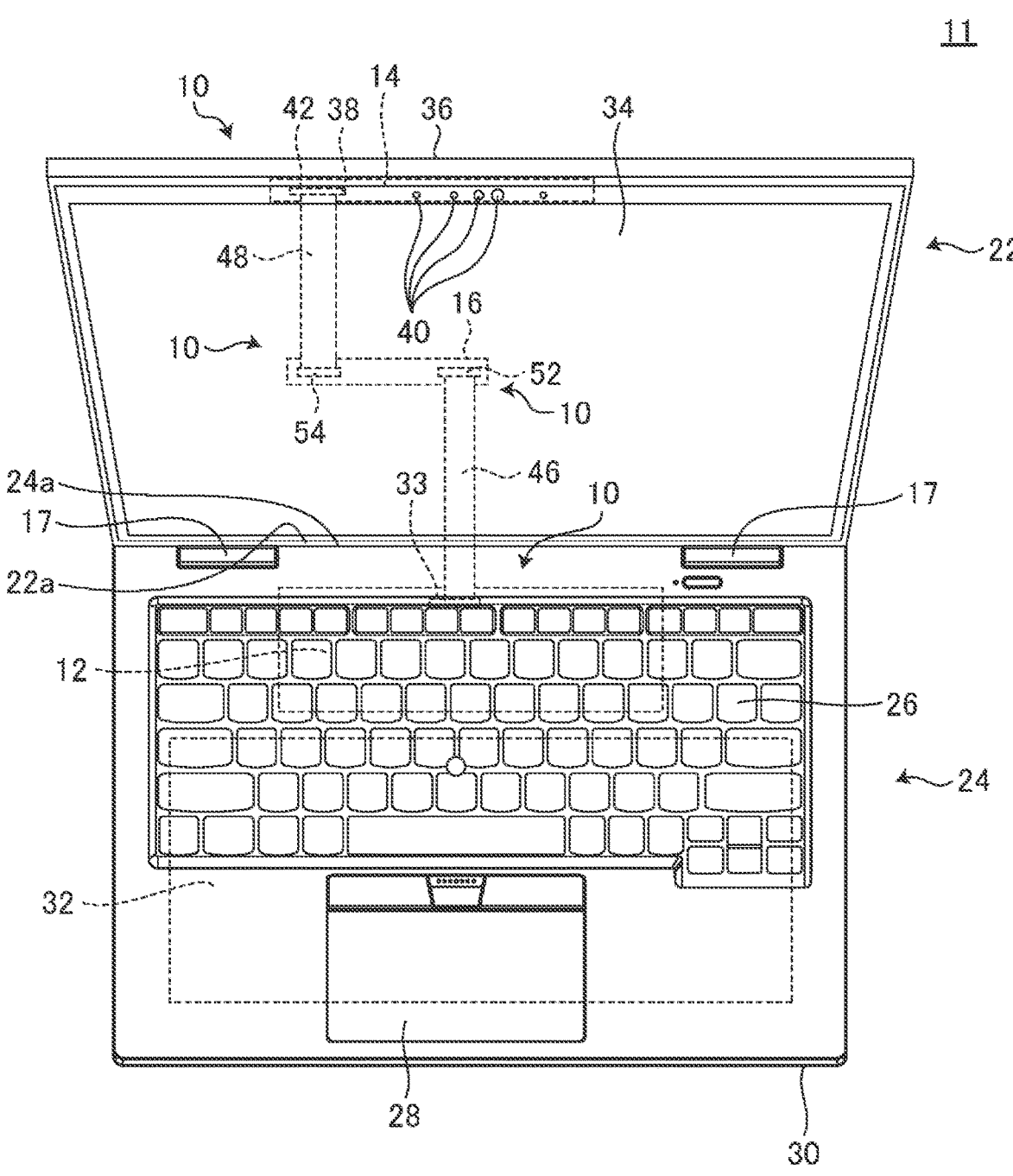
FIG. 1 is a perspective view of an electronic apparatus to which a connection structure and an electronic substrate according to an embodiment of the present invention have been applied.

FIG. 1 is a perspective view of an electronic apparatus 11 to which a connection structure 10 and electronic substrates 12, 14 and 16 according to an embodiment of the present invention have been applied. The electronic substrates 12, 14 and 16 are, for example, glass epoxy substrates or printed circuit boards. The electronic substrates according to the aspects of the present invention shall include both PWB (Printed Wiring Board) before component mounting and PCB ASSY (Printed Circuit Board Assembly) after mounting.

Although the electronic apparatus 11 illustrated herein is a laptop PC, the connection structure and the electronic substrate according to the aspects of the present invention can be applied to other electronic apparatuses such as a tablet PC, a mobile phone, a smartphone, or a portable game machine.

FIG. 1 illustrates a state in which a display chassis 22 has been opened from a main body chassis 24 through hinges 17. As illustrated in FIG. 1, the electronic apparatus 11 is configured by rotatably connecting a connecting edge 22*a*, which is the bottom edge of the display chassis 22, and a connecting edge 24*a*, which is a rear edge of the main body chassis 24, by a pair of left and right hinges 17, 17.

The main body chassis 24 is a thin rectangular box body. A keyboard 26 and a touchpad 28 are provided on the upper surface of the main body chassis 24. The lower surface of the main body chassis 24 is covered by a lower surface cover 30. An electronic substrate 12 and a battery 32 and the like are provided inside the main body chassis 24. The electronic substrate 12 is a motherboard controlling the entire electronic apparatus 11. A connector 33 is mounted on the electronic substrate 12.

The display chassis 22 is a thin rectangular box body, and has a display 34 of the front surface, a cover 36 covering the back surface of the display 34, and a bezel 38 surrounding the periphery of the display 34. The display 34 is, for example, an organic EL (OLED). A plurality of electronic devices 40 are provided substantially at the center of the upper side of the bezel 38. The electronic devices 40 are cameras, microphones, infrared devices, and the like. The electronic devices 40 are mounted on the electronic substrate 14 located on the back side of the bezel 38. In other words, the electronic substrate 14 can be referred to as a device substrate. The electronic substrate 14 is further provided with a connector 42 mounted thereon. Inside the display chassis 22, the electronic substrate 16 is provided between the display 34 and the cover 36.

Figure 2:
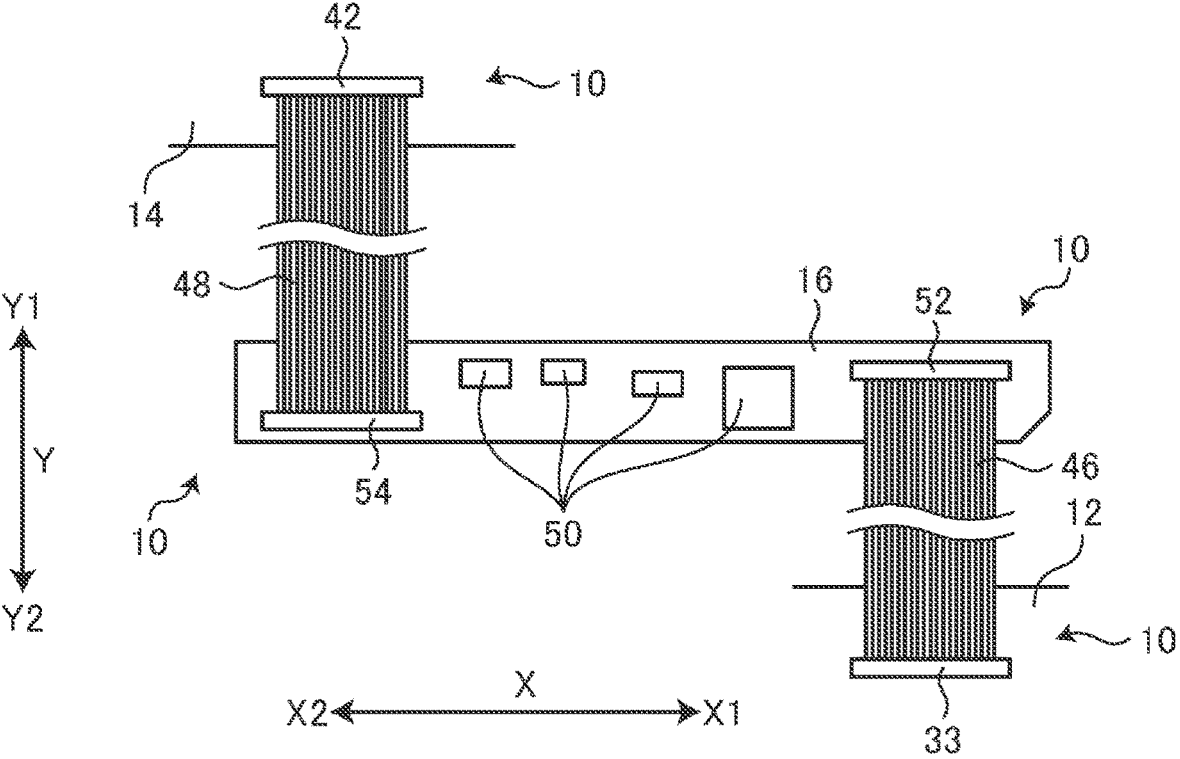
FIG. 2 is a schematic plan view of the electronic substrate and flat cables.

FIG. 2 is a schematic plan view of the electronic substrate 16 and flat cables 46, 48. The electronic substrate 16 is formed so as to have a small and thin rectangular shape elongated in the horizontal direction, and can be placed in a narrow gap between the display 34 and the cover 36. A plurality of chips 50 for controlling the electronic devices 40 are mounted on the electronic substrate 16. In other words, the electronic substrate 16 can be referred to as a control substrate. The electronic substrate 16 is further provided with connectors 52, 54 mounted thereon. The flat cable 46 is connected to the connector 52. The other end of the flat cable 46 is connected to the connector 33 of the electronic substrate 12. The flat cable 48 is connected to the connector 54. The other end of the flat cable 48 is connected to the connector 42 of the electronic substrate 14.

The connectors 52, 54 are low and elongated along the long side direction of the electronic substrate 16. The connectors 52, 54 are small and multipolar. The plurality of chips 50 are mounted between the connector 52 and the connector 54. The flat cables 46, 48 extend along the short side direction of the electronic substrate 16, and extend along the surface of the electronic substrate 16 from the connectors 52, 54.

In the following description, the long side direction of the electronic substrate 16 and the connectors 52, 54 will be defined as an X direction, one side of which (the connector 52 side) will be defined as an X1 direction, and the other side of which (the connector 54 side) will be defined as an X2 direction. In the present embodiment, the X direction corresponds to the left-right direction of the electronic apparatus 11. The direction in which the flat cables 46, 48 extend, i.e., the direction orthogonal to the X direction, will be defined as a Y direction. One side of the Y direction (the electronic substrate 14 side) will be defined a Y1 direction, and the other side (the electronic substrate 12 side) will be defined a Y2 direction. The connector 52 is located at a position in the vicinity of the end in the X1 direction and closer to the Y1 direction. The connector 54 is located at a position in the vicinity of the end in the X2 direction and closer to the Y2 direction.

The flat cables 46, 48 are FPCs (Flexible Printed Circuits), but may alternatively be FFCs (Flexible Flat Cables) or the like. The flat cables 46, 48 are multi-conductor and thin, and can be routed in a narrow space in the display chassis 22. The flat cable 46 is flexible and does not deteriorate due to bending between the display chassis 22 and the main body chassis 24 when the display chassis 22 is opened and closed.

Figure 3:
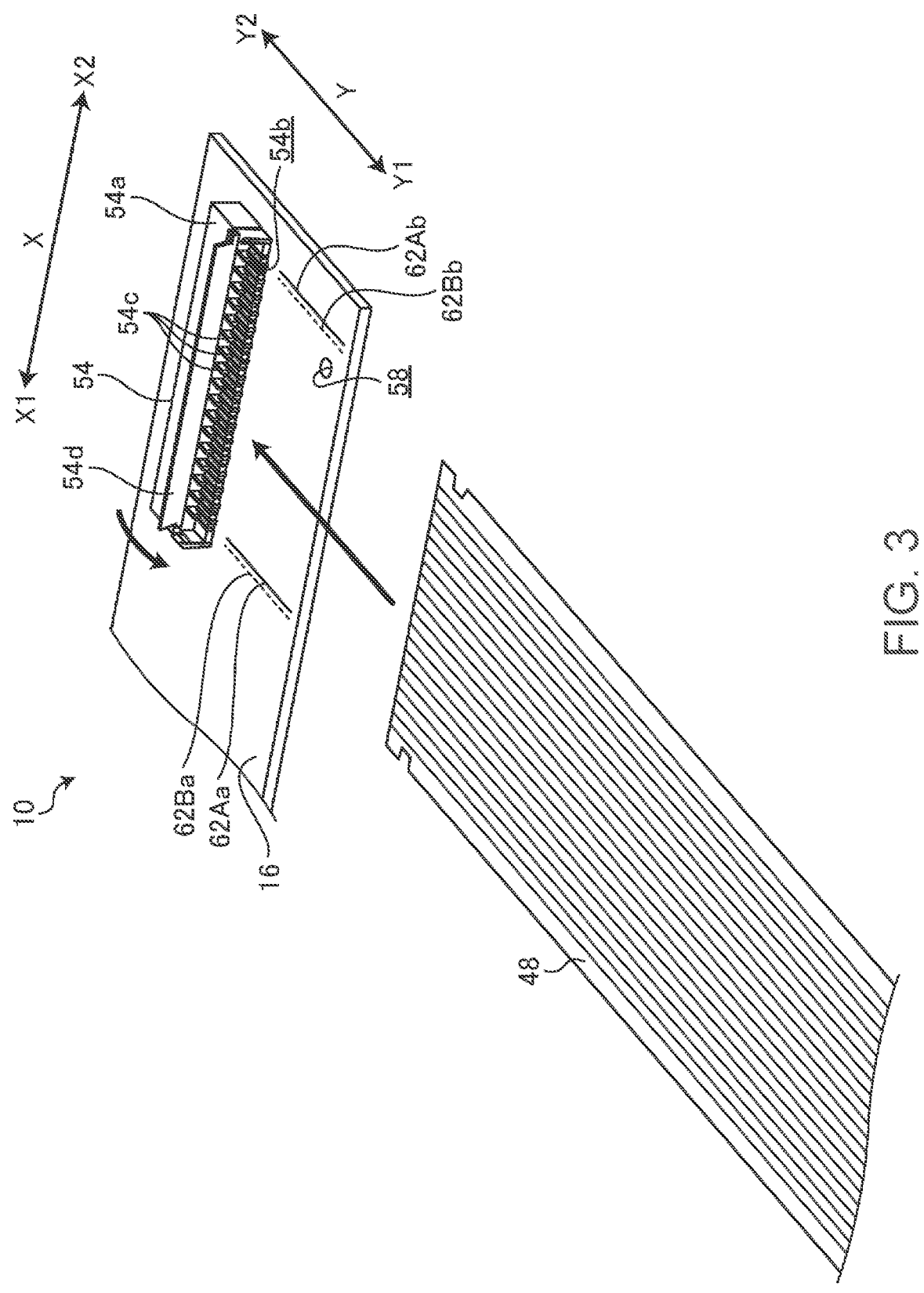
FIG. 3 is an exploded perspective view of a connection structure including the electronic substrate, a connector, and the flat cable.

FIG. 3 is an exploded perspective view of the connection structure 10 that includes the electronic substrate 16, the connector 54, and the flat cable 48. At this location, the connection structure 10 is formed by the electronic substrate 16, the connector 54, and the flat cable 48. The connection between the flat cable 48 and the connector 42, the connection between the flat cable 46 and the connector 52, and the connection between the flat cable 46 and the connector 54 are substantially the same as those of the examples illustrated in FIG. 3 and FIG. 4, except for some dimensions, the number of electrodes, and the like, although detailed illustrations and descriptions for the above-mentioned connections are omitted.

As illustrated in FIG. 3, the connector 54 is, for example, a ZIF (Zero Insertion Force) connector, and has a main body case 54a, a recessed portion 54b formed on the Y1 direction side, multiple electrodes 54c arranged in the recessed portion 54b, and an elevation opening/closing type cover 54d that covers the recessed portion 54b. The connector 54 is multipolar, so that the interval between the electrodes 54c is small. In the connector 54, with the cover 54d open, the end of the flat cable 48 is inserted into the recessed portion 54b and brought into contact with the electrodes 54c, and then the cover 54d is closed to connect and fix the flat cable 48.

The connector 54 does not require a force to insert the flat cable 48, resulting in easier work. The connector 54 is a ZIF connector, but may alternatively be a non-ZIF connector. The connector 54 is a flip-lock type, but may alternatively be a different type. The connector 54 is basically a surface mounting type. An end of the electronic substrate 16 has a screw hole 58 formed at a location covered by the flat cable 48.

Figure 4:
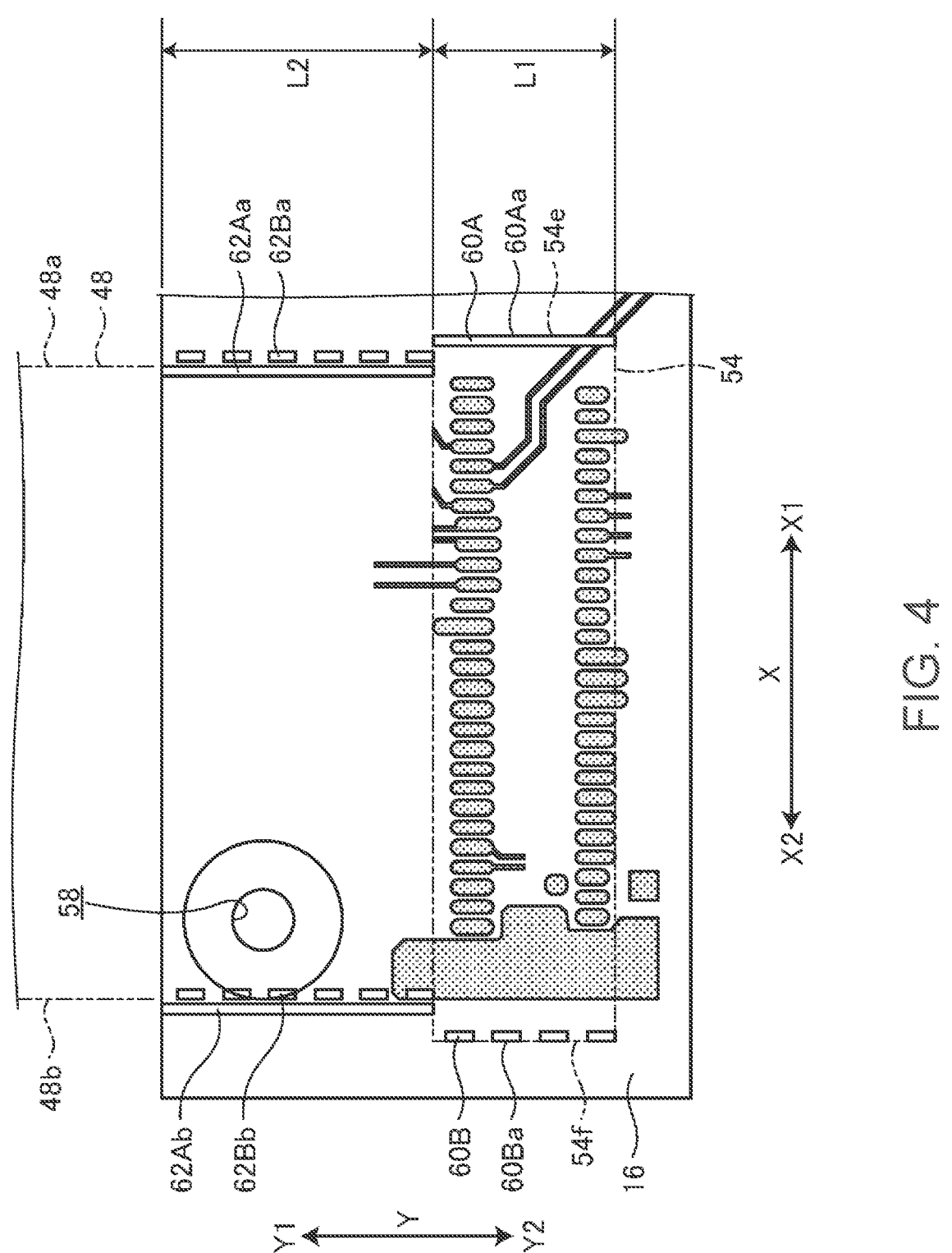
FIG. 4 is an enlarged plan view of a location where the connector is mounted on the electronic substrate in a state before components are mounted.

FIG. 4 is an enlarged plan view of the place where the connector 54 is mounted on the electronic substrate 16 before component mounting. Referring to FIG. 4, the connector 54 indicated by the virtual lines shows a position where the connector 54 is to be mounted at the normal position on the electronic substrate 16. Further, the flat cable 48 indicated by the virtual lines shows the position where the flat cable 48 is to be connected and fixed to the connector 54 at the normal position. The dotted areas in FIG. 4 are lands, pads, or patterns.

In the electronic substrate 16, at the location where the connector 54 is to be mounted, a Type 1 connector line 60A is marked along the Y direction on the X1 direction side, and a Type 2 connector line 60B is marked along the Y direction on the X2 direction side. Outer edges 60Aa, 60Ba of the connector lines 60A, 60B match outer edges 54e, 54f of the connector 54 to be mounted at the normal position. In other words, the connector lines 60A, 60B are marked so as to be covered by the connector 54. The effective length L1 of the connector lines 60A, 60B is in the same range as that of the width of the connector 54 in the Y direction, but may be slightly longer than that.

Further, in the electronic substrate 16, a Type 1 cable line 62Aa and a Type 2 cable line 62Ba are marked in parallel on the end in the X1 direction at a location where the flat cable 48 extends, and the Type 1 cable line 62Aa is relatively on the inner side, and the Type 2 cable line 62Ba is relatively on the outer side. A Type 1 cable line 62Ab and a Type 2 cable line 62Bb are marked in parallel on the end in the X2 direction, and the Type 1 cable line 62Ab is relatively on the outer side, and the Type 2 cable line 62Bb is relatively on the inner side.

At an edge 48a of the flat cable 48 in the X1 direction, the Type 1 cable line 62Aa is marked on the inner side and the Type 2 cable line 62Ba is marked on the outer side, with the edge 48a of the flat cable 48 to be connected at the normal position being a border therebetween. The Type 2 cable line 62Ba is adjacently marked on the outer side of the Type 1 cable line 62Aa. In the X direction, the outer side is the side far from the center of the flat cable 48 and the inner side is the side close to the center.

At the edge 48b of the flat cable 48 in the X2 direction, the Type 2 cable line 62Bb is marked on the inner side and the Type 1 cable line 62Ab is marked on the outer side, with the edge 48b of the flat cable 48 to be connected at the normal position being a border therebetween. The Type 1 cable line 62Ab is adjacently marked on the outer side of the Type 2 cable line 62Bb. Narrow gaps of the same width are formed between the Type 1 cable line 62Aa and the Type 2 cable line 62Ba, and between the Type 1 cable line 62Ab and the Type 2 cable line 62Bb. However, these take into account the margins for a printer or the like, and preferably there may be no gap between the Type 1 cable line 62A and the Type 2 cable line 62B.

The connector 54 is provided at a position closer to the Y2 side on the electronic substrate 16, so that the distance to the edge on the Y1 side is secured, thus allowing the cable line 62 to be marked to an appropriate length. The cable line 62 has an effective length L2 from the edge on the Y1 side of the electronic substrate 16 to the edge on the Y1 side of the connector 54, but may be further extended to the Y2 side. The cable line 62A does not necessarily reach the edge on the Y1 side of the electronic substrate 16 as long as the cable line 62A has an appropriate length. The effective length L2 of the cable line 62 is substantially a length within a range of not being covered by the connector 54.

The Type 1 connector line 60A and the Type 1 cable lines 62Aa, 62Ab are denoted by the solid lines, and the Type 2 connector line 60B and the Type 2 cable lines 62Ba, 62Bb are denoted by the dashed lines for easy discrimination. This means that, in the present embodiment, the Type 1 indicates the solid line, and the Type 2 indicates the dashed line. The solid line and the dashed line may be reversed.

The Type 1 connector line 60A, the Type 1 cable lines 62Aa, 62Ab, the Type 2 connector line 60B, and the Type 2 cable lines 62Ba, 62Bb have the same width, and are marked in white by silk printing. The silk printing is used also for indicating information on other mounted components on the electronic substrate 16, so that no dedicated process for printing the lines is required, thus avoiding higher cost.

The Type 1 connector line 60A and the Type 1 cable lines 62Aa, 62Ab are lines of the same type, and the Type 2 connector line 60B and the Type 2 cable lines 62Ba, 62Bb are lines of the same type except that the lines are distinguishably different from the Type 1 connector line 60A and the Type 1 cable lines 62Aa, 62Ab, and may be, for example, lines of a different color.

In the present embodiment, the width of each part in the X direction is 14 mm for the connector 54, and 0.15 mm for the connector line 60 and the cable line 62. Further, the distance between the Type 1 cable line 62Aa and the Type 2 cable line 62Bb and between the Type 1 cable line 62Ab and the Type 2 cable line 62Bb is 0 to 0.1 mm. However, these dimensions may change depending on the number of conductors, pitch, or design conditions and the like.

FIG. 4 illustrates a state before the connector 54 is mounted. In the connection structure 10 according to the first embodiment of the present embodiment, the connector 54 will be mounted at the normal position indicated by the virtual lines, and the flat cable 48 will be connected and fixed at the normal position indicated by the virtual lines. According to the connection structure 10 in this case, at the edge 48a of the flat cable 48 in the X1 direction, the Type 1 cable line 62Aa is marked on the inner side and the Type 2 cable line 62Ba is marked on the outer side, with the edge 48a being the border therebetween. Further, at the edge 48b in the X2 direction, the Type 1 cable line 62Ab is marked on the outer side and the Type 2 cable line 62Bb is marked on the inner side, with the edge 48b being the border therebetween. This makes both the connector lines 60A and 60B visually unrecognized, so that a worker, who connects and fixes the flat cable 48 to the connector 54, can confirm that the connector 54 has been mounted at the normal position.

In addition, after the work for connecting and fixing the flat cable 48, the Type 1 cable line 62Aa is covered by the flat cable 48 and the Type 2 cable line 62Ba is exposed at the edge 48*a* of the flat cable 48 in the X1 direction, and the Type 2 cable line 62Bb is covered by the flat cable 48 and the Type 1 cable line 62Ab is exposed at the edge 48*b* in the X2 direction. This enables the worker to confirm that the flat cable 48 has been properly connected to the connector 54.

Conversely, the worker should connect the flat cable 48 to the connector 54 such that the Type 1 cable line 62Aa and the Type 2 cable line 62Bb are covered, and the Type 1 cable line 62Ab and the Type 2 cable line 62Ba are exposed. To describe in a simpler rule, one solid line and one dashed line should be exposed. Thus, the cable lines 62 have an alignment function with respect to the flat cable 48.

Although not illustrated, if the flat cable 48 were inconveniently connected to the connector 54 slightly displaced from the normal position in the X1 direction, then the Type 2 cable line 62Ba on the X1 side would be partly or entirely covered by the flat cable 48, and the Type 2 cable line 62Bb on the X2 side would be partly or entirely exposed. Further, if the flat cable 48 were inconveniently connected to the connector 54 slightly displaced from the normal position in the X2 direction, then the Type 1 cable line 62Ab on the X2 side would be partly or entirely covered by the flat cable 48, and the Type 1 cable line 62Aa on the X1 side would be partly or entirely exposed. The exposure and the occultation of the lines enable the worker to visually check with ease that the flat cable 48 has been connected to the connector 54 in a displaced manner, and to immediately redo the work.

Further, as described above, the cable line 62 is moderately long, which facilitates the checking work. More specifically, for the matching of the cable lines 62, the effective length L2, which is longer than the effective length L1 of the connector 54 and the connector lines 60, which is at least a comparison target standard, makes the connecting and checking work easy.

A description will now be given of the case where the connector 54 is mounted slightly displaced from the normal position on the electronic substrate 16 due to the performance of a mounting machine, or the like.

Figure 5:
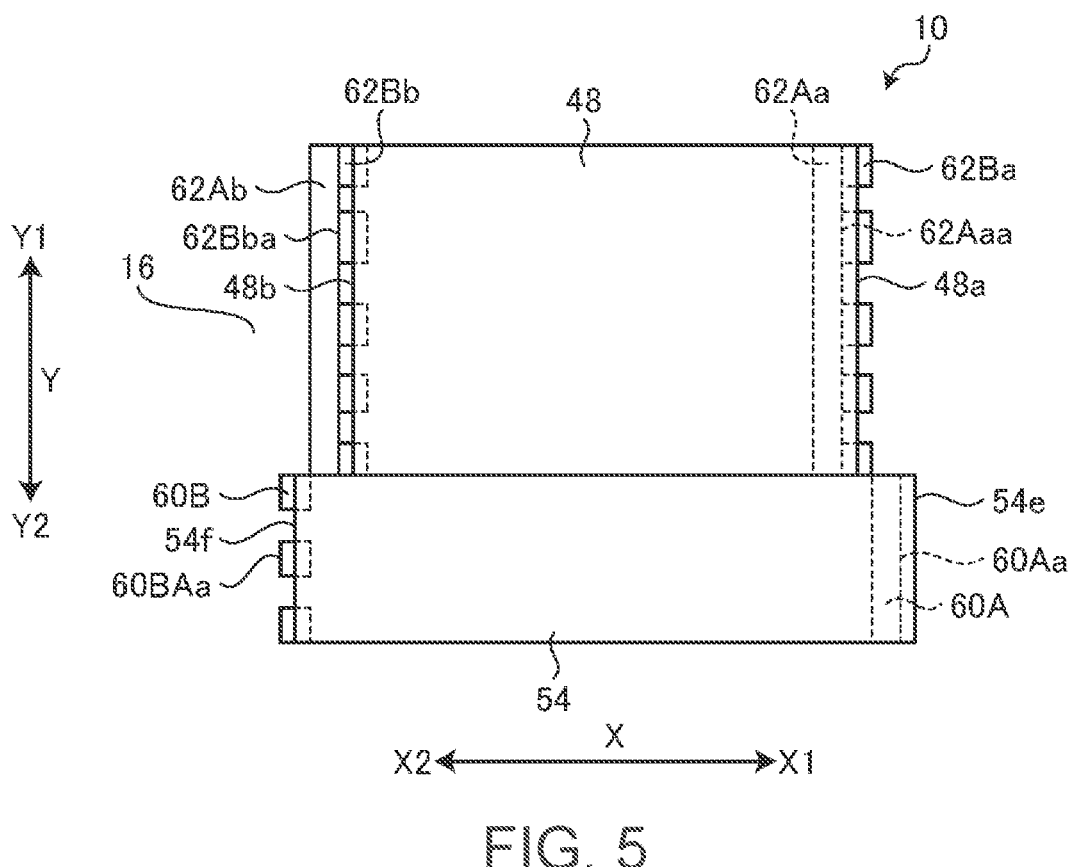
FIG. 5 is a schematic plan view illustrating the case where the connector has been mounted slightly displaced in an X1 direction from a normal position whereas the flat cable has been properly connected to the connector.

FIG. 5 is a schematic plan view illustrating the case where the connector 54 has been mounted slightly displaced in the X1 direction from the normal position, while the flat cable 48 has been properly connected to the connector 54. The maximum width of displacement of the connector 54 in the X1 direction is such that the Type 2 connector line 60B is not entirely exposed, and the maximum width of displacement in the X2 direction is such that the Type 1 connector line 60A is not entirely exposed.

In this state, the connector 54 is slightly displaced in the X1 direction, and therefore, the Type 1 connector line 60A is covered by the connector 54 while the Type 2 connector line 60B is partly exposed. This enables the worker to recognize the displacement of the connector 54.

Further, in this state, the flat cable 48 is also positioned slightly displaced in the X1 direction to match the connector 54. In other words, on the X1 side, the Type 1 cable line 62Aa is covered by the flat cable 48, while the Type 2 cable line 62Ba is partly covered and partly exposed. On the X2 side, the Type 1 cable line 62Ab is exposed, while the Type 2 cable line 62Bb is partly covered and partly exposed.

In other words, in a state in which the connector 54 is displaced in the X1 direction, causing the Type 2 connector line 60B of the dashed line to be visually recognized, the Type 2 cable lines 62Ba, 62Bb of the dashed lines will be exposed also at both sides of the flat cable 48. Conversely, in a state in which the Type 2 connector line 60B is visually recognized, the worker should perform positioning also for the flat cable 48 such that the Type 2 cable lines 62Ba, 62Bb of the dashed lines are visually recognized at both sides.

Figure 6:
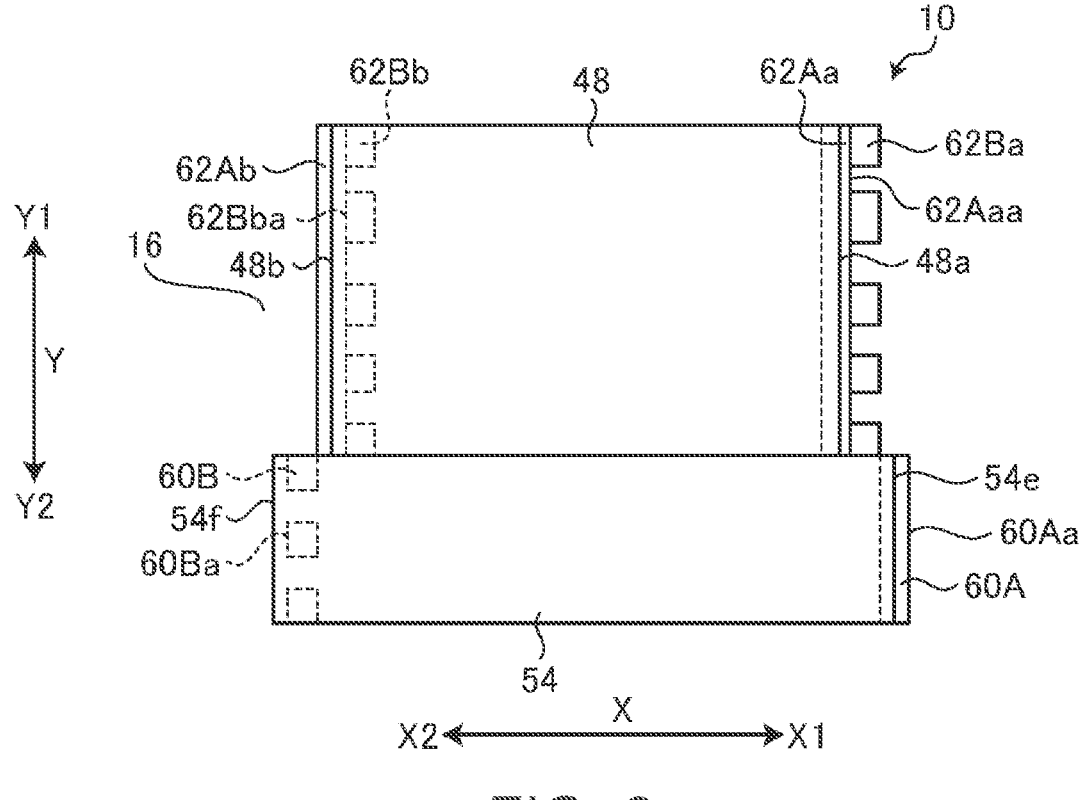
FIG. 6 is a schematic plan view illustrating the case where the connector has been mounted slightly displaced in an X2 direction from the normal position whereas the flat cable has been properly connected to the connector.

FIG. 6 is a schematic plan view illustrating a state in which the connector 54 has been mounted slightly displaced in the X2 direction from the normal position, and the flat cable 48 has been properly connected to the connector 54.

In this state, the connector 54 is slightly displaced in the X2 direction, which is opposite from the example illustrated in FIG. 5, so that the Type 2 connector line 60B is covered by the connector 54, while the Type 1 connector line 60A of the solid line is partly exposed. This enables the worker to recognize the displacement of the connector 54. Further, on the X2 side of the flat cable 48, the Type 2 cable line 62Bb is covered by the flat cable 48, while the Type 1 cable line 62Ab is partly covered and partly exposed. On the X1 side, the Type 2 cable line 62Ba is exposed, while the Type 1 cable line 62Aa is partly covered and partly exposed. Further, for the flat cable 48, the worker should perform positioning such that the Type 1 cable lines 62Aa, 62Ab of the solid lines are visually recognized also at both sides. This makes it easy to perform the connection work and the subsequent checking work.

Thus, when the Type 1 connector line 60A of the solid line or the Type 2 connector line 60B of the dashed line is exposed, the worker can easily recognize that the connector 54 has been mounted displaced in either the X1 or X2 direction. The exposed Type 1 connector line 60A of the solid line or the Type 2 connector line of the dashed line becomes an indicator, and therefore, the worker should perform positioning such that the line types that match the indicator lines are exposed on left and right also for the flat cable 48. This makes it possible to prevent poor connection between the connector 54 and the flat cable 48. Further, the worker can easily perform the connection work and the subsequent checking work according to the simple rule of exposing the three lines of the same line type.

Figure 7:
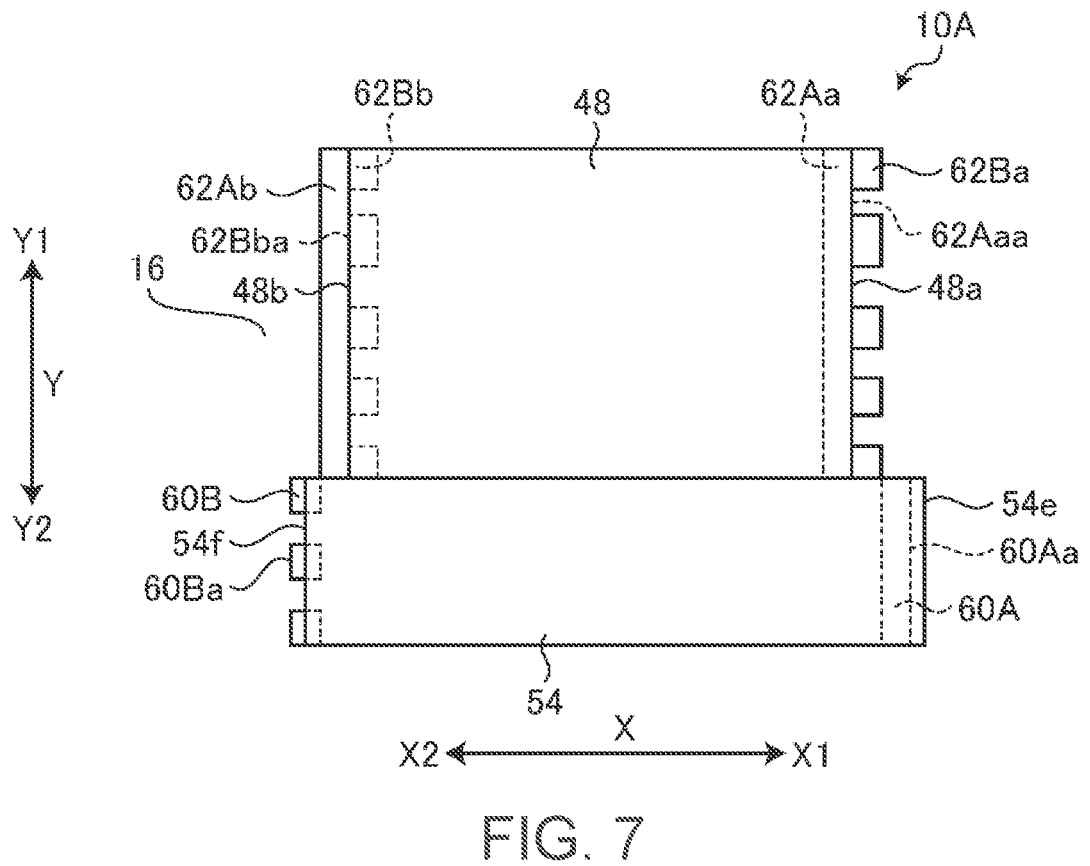
FIG. 7 is a schematic plan view illustrating the case where the connector has been mounted slightly displaced in the X1 direction from the normal position, and the flat cable has been connected to the connector in a displaced manner.

FIG. 7 is a schematic plan view illustrating the case where the connector 54 has been mounted slightly displaced in the X1 direction from the normal position, and the flat cable 48 has been connected to the connector 54 in a displaced manner. In this state, as with the example of FIG. 5, the Type 2 connector line 60B is partly exposed, and the flat cable 48 needs to be placed at a position slightly deviated in the X1 direction to match the connector 54.

Figure 8:
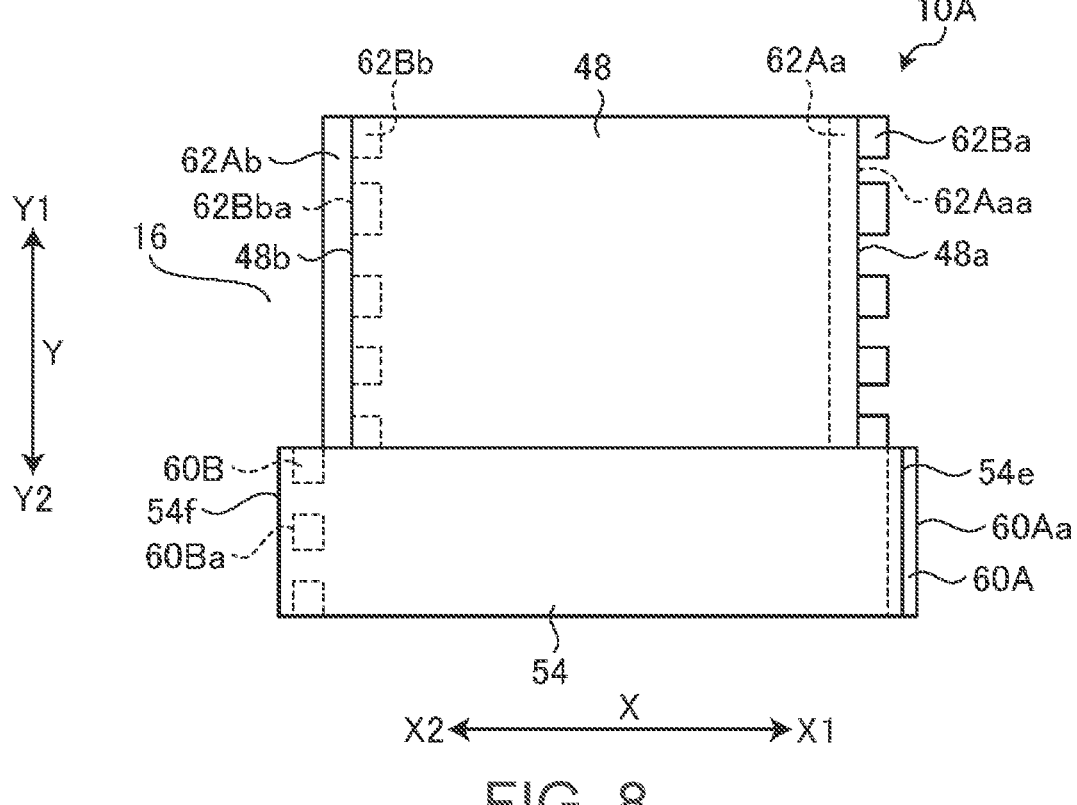
FIG. 8 is a schematic plan view illustrating the case where the connector has been mounted slightly displaced in the X2 direction from the normal position, and the flat cable has been connected to the connector in a displaced manner.

FIG. 8 is a schematic plan view illustrating the case where the connector 54 has been mounted slightly displaced in the X2 direction from the normal position, and the flat cable 48 has been connected to the connector 54 in a displaced manner. In this state, as with the example of FIG. 6, the Type 1 connector line 60A is partly exposed, and the flat cable 48 needs to be placed at a position slightly deviated in the X2 direction to match the connector 54.

In the examples of FIG. 7 and FIG. 8, the flat cable 48 is placed at the same position indicated by the virtual lines in FIG. 4. More specifically, the Type 1 cable line 62Aa and the Type 2 cable line 62Bb are covered by the flat cable 48, while the Type 1 cable line 62Ab and the Type 2 cable line 62Ba are exposed. This state violates the rule of exposing three lines of the same type, which enables the worker to check by himself or herself that the flat cable 48 has been improperly connected to the connector 54, and to redo the connection work on the spot. It is needless to say that a subsequent inspection process performed by another worker or an automated machine, or the like may be provided. The states in FIG. 7 and FIG. 8 illustrate examples of improper positioning, so that a symbol 10A is used to distinguish from the proper connection structure 10.

It is needless to say that the present invention is not limited to the embodiment described above, and may be freely modified within a scope that does not deviate from the gist of the present invention.

The invention claimed is:

1. A connection structure having a connector, a flat cable, and an electronic substrate, wherein the connector is configured to connect to the flat cable and to mount on the electronic substrate, comprising:

a Type 1 connector line, on the substrate, extends along a length direction of the flat cable on one side of the substrate in a width direction that is orthogonal to the length direction; and a Type 2 connector line, on the substrate, extends along the length direction on an opposite side of the substrate, both of the Type 1 and Type 2 connector lines being at a location where the connector is to be mounted on the substrate; and a Type 1 cable line and an adjacent Type 2 cable line, both on the substrate, extend along the length direction on both ends of the substrate in the width direction at a location where the flat cable extends when connected to the connector, wherein the Type 1 connector line and the Type 2 connector line are configured to be covered by the connector when mounted in alignment on the substrate, with outer edges of the Type 1 and Type 2 connector lines matching outer edges of the connector, at an edge of one side of the flat cable, a Type 1 cable line extends along on an inner side thereof and a Type 2 cable line extends along on an outer side thereof, with the edge of the one side being a border between the Type 1 and Type 2 cable lines on the one side, at an edge of another side of the flat cable, a Type 1 cable line extends along on an outer side thereof and a Type 2 cable line extends along on an inner side thereof, with the edge of the another side being a border between the Type 1 and Type 2 cable lines on the another side, the Type 1 connector line and the Type 1 cable line are lines of the same type, and the Type 2 connector line and the Type 2 cable line are lines of the same type but are lines of a different type from the Type 1 connector line and the Type 1 cable line.

2. A connection structure having a connector, a flat cable, and an electronic substrate, wherein the connector is configured to connect to the flat cable and to mount on the electronic substrate, comprising:

a Type 1 connector line, on the substrate, extends along a length direction of the flat cable on one side of the substrate in a width direction that is orthogonal to the length direction; and a Type 2 connector line, on the substrate, extends along the length direction on an opposite side of the substrate, both of the Type 1 and Type 2 connector lines being at a location where the connector is to be mounted on the substrate; and a Type 1 cable line and an adjacent Type 2 cable line, both on the substrate, extend in parallel on both ends of the substrate in the width direction and at a location where the flat cable extends when connected to the connector, wherein, when the connection structure is misaligned, the Type 2 connector line is covered by the connector, and the Type 1 connector line is partly exposed, wherein, when the connection structure is misaligned, at an edge of one side of the flat cable, the Type 1 cable line is partly covered by the flat cable, and the Type 2 cable line is exposed at a position adjacent to an outer side of the Type 1 cable line, wherein, when the connection structure is misaligned, at an edge of another side of the flat cable, the Type 1 cable line is partly covered by the flat cable, and the Type 2 cable line is at a position adjacent to an inner side of the Type 1 cable line, the Type 1 connector line and the Type 1 cable line are lines of the same type, and the Type 2 connector line and the Type 2 cable line are lines of the same type but are lines of a different type from the Type 1 connector line and the Type 1 cable line.

3. The connection structure according to claim 1, wherein one of a combination of the Type 1 connector line and the Type 1 cable line and a combination of the Type 2 connector line and the Type 2 cable line is a solid line, and the other combination is a dashed line.

4. The connection structure according to claim 1, wherein the Type 1 connector line, the Type 1 cable line, the Type 2 connector line, and the Type 2 cable line are made by silk printing.

5. The connection structure according to claim 1, wherein lengths of the Type 1 cable line and the Type 2 cable line in the length direction that are not covered by the connector are greater than a length of the connector.

6. An electronic substrate for mounting by a connector that can connect to and fix a flat cable, comprising:

a Type 1 connector line, on the substrate, extends along a length direction of the flat cable on one side of the substrate in a width direction that is orthogonal to the length direction; and a Type 2 connector line, on the substrate, extends along the length direction on an opposite side of the substrate, both of the Type 1 and Type 2 connectors being at a location where the connector is to be mounted on the substrate; and a Type 1 cable line and a Type 2 cable line extend in parallel on both ends of the substrate in the width direction and at a location where the flat cable extends when connected to the connector, wherein, when the connector is mounted on the substrate at a normal position, the Type 1 connector line and the Type 2 connector line are covered by the connector, and outer edges of the Type 1 and Type 2 connector lines match the connector, wherein, when the flat cable is connected to the connector at the normal position, at an edge of one side of the flat cable, a Type 1 cable line, on the substrate, is on an inner side and a Type 2 cable line, on the substrate, is on an outer side, with the edge of the one side being a border between the Type 1 and Type 2 cable lines on the one side, wherein, when the flat cable is connected to the connector at the normal position, at an edge of another side of the flat cable, a Type 1 cable line, on the substrate is on an outer side and a Type 2 cable line, on the substrate is on an inner side, with the edge of the another side being a border between the Type 1 and Type 2 cable lines on the another side, the Type 1 connector line and the Type 1 cable line are lines of the same type, and the Type 2 connector line and the Type 2 cable line are lines of the same type but are lines of a different type from the Type 1 connector line and the Type 1 cable line.

* * * * *